United States Patent [19]
Vondran

[11] 3,722,990
[45] Mar. 27, 1973

[54] EVR PLAYER LENS SYSTEM
[75] Inventor: Daniel J. Vondran, Chicago, Ill.
[73] Assignee: Motorola Inc., Franklin Park, Ill.
[22] Filed: Mar. 16, 1971
[21] Appl. No.: 124,839

[52] U.S. Cl. ................. 352/231, 350/247, 352/139, 352/140, 353/96, 353/101
[51] Int. Cl. .......................... G03b 1/48, G03b 3/00
[58] Field of Search ........ 352/231, 139, 140; 353/96, 353/100, 101; 350/247, 255; 178/7.2

[56] References Cited

UNITED STATES PATENTS

| 2,029,938 | 2/1936 | Newman | 353/101 |
| 3,286,591 | 11/1966 | Nitkiewicz | 350/247 X |
| 2,429,164 | 10/1947 | Mast et al. | 353/101 X |

FOREIGN PATENTS OR APPLICATIONS

| 971,822 | 4/1959 | Germany | 352/231 |

Primary Examiner—Robert P. Greiner
Attorney—Mueller & Aichele

[57] ABSTRACT

An Electronic Video Recording (EVR) player has a flying spot scanner tube for producing a raster which is focused by a lens system upon a film moving across openings in a film gate. The lenses in the lens system are eccentrically mounted in a frame and are provided with a focusing adjustment and a centering adjustment so that proper alignment of the lens system with the film gate and the flying spot scanner tube may be effected. Included in the film gate assembly is a sub-assembly for mounting film gate prisms and the synchronizing light in a single unit which is attached to the film gate and mounted in the frame which holds the lens systems. Flanges are provided on the film gate to protect the prisms against damage. Collector prisms are mounted on a collector prism frame for collecting light passing through the film gate openings and may be vertically adjusted for alignment with the openings. The collector prisms are clamped together along with a synchronizing light pick-up filament by a metal band which holds these optical elements together.

13 Claims, 17 Drawing Figures

PATENTED MAR 27 1973 3,722,990

INVENTOR
DANIEL J. VONDRAN

BY Mueller & Aichele
ATTORNEYS

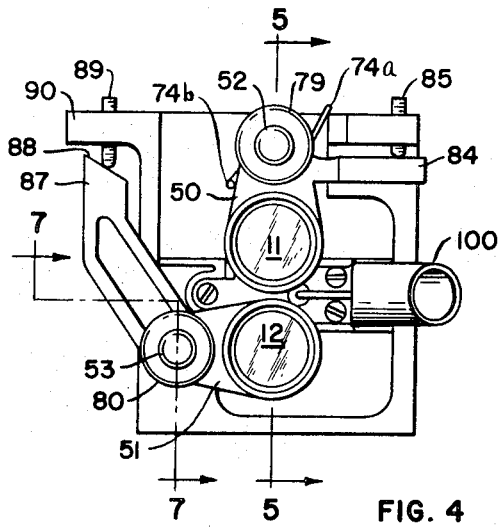
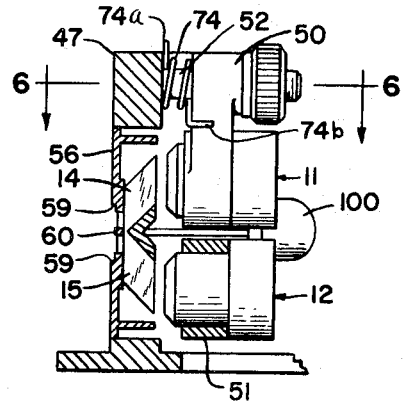
FIG. 4         FIG. 5
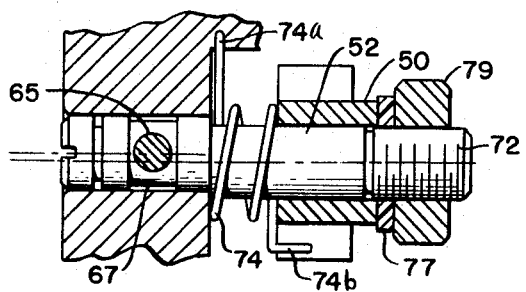
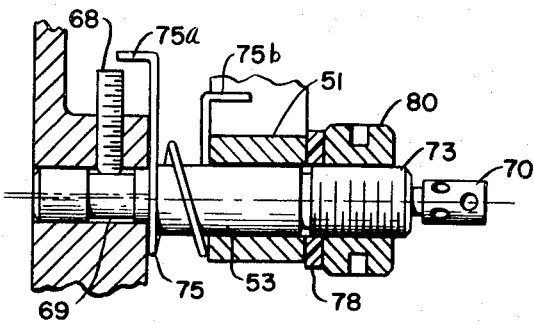
FIG. 6         FIG. 7
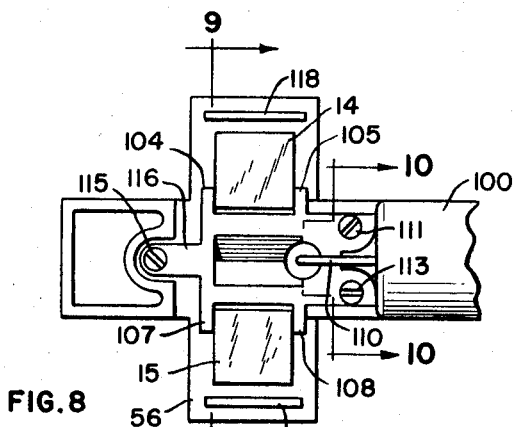
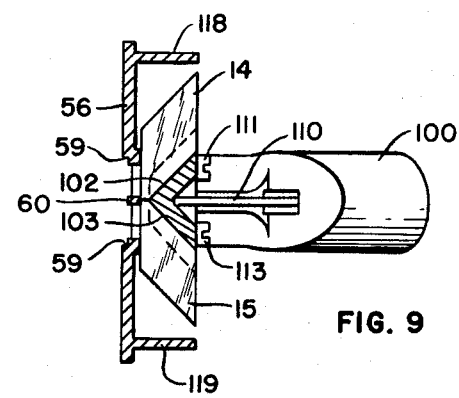
FIG. 8         FIG. 9
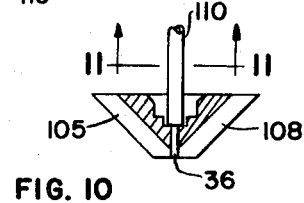
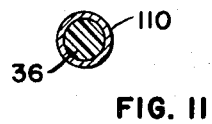
FIG. 10        FIG. 11

EVR PLAYER LENS SYSTEM

BACKGROUND OF THE INVENTION

In an Electronic Video Recording (EVR) player, a film carrying the video information is continuously moved past a film gate, with the player in a normal play mode of operation. A flying spot scanner cathode-ray-tube produces a scanning raster to cause a beam of light to scan the moving film. Two channels of information are recorded on the film, with these channels corresponding either to first and second black-and-white channels or to the luminance and chrominance information channels, respectively, of a color signal. The raster produced on the screen of the flying spot scanner tube is focused by first and second lens systems through first and second corresponding prisms to corresponding first and second openings in the film gate. One channel of the film passes a different one of the two openings in the film gate, so that each of the channels on the film is simultaneously scanned with the same raster.

The modulated beams of light passing through the film are applied to a pair of collector prisms located opposite the openings in the film gate corresponding to the first and second channels of information recorded on the film.

It is especially important when a color film is to be reproduced in the player that precisely the same corresponding lines of information in both of the channels are simultaneously scanned. If this is not done, the color image which is reproduced by the television set being supplied with signals from the EVR player is of reduced quality, since the color information obtained from one of the channels of the EVR film does not correspond to the black-and-white or luminance information obtained from the other of the channels. As a consequence, it is necessary to provide a means for adjusting the lens system to cause the scanning raster applied to each of the channels of film to correspond to the raster applied to the other channel. It also is desirable to provide for an adjustment of the lens system which may be effected with a minimum of difficulty.

SUMMARY OF THE INVENTION

It is an object of this invention to provide an improved lens system for an EVR player.

It is an additional object of this invention to provide an improved lens adjustment and alignment apparatus for the lens system of an EVR Player.

It is another object of this invention to employ a single spring in the lens adjustment and alignment mechanism of an EVR player used in compression for focusing adjustment and used in torsion for a lens positioning adjustment.

It is a further object of this invention to use a unitary sub-assembly for holding the prisms of an EVR player lens system and the housing and light guide for the synchronizing light of the EVR player.

It is still another object of this invention to clamp the collector prisms and the synchronizing light collector of an EVR player together as a unit to establish the relative positions of these light collecting components with respect to the film gate of the player.

In accordance with the preferred embodiment of this invention, an EVR player includes a flying spot scanner cathode-ray-tube for generating a raster to be used for scanning a film passing across a film gate in the player. A lens system is provided for directing the raster displaced on the screen of the flying spot scanner tubes to the film at the film gate, and a lens adjustment and alignment apparatus is employed to focus and adjust the position of the raster applied to the film at the film gate. This lens adjustment system includes a lens housing lever with a lens holder in one end which is rotatably mounted on one end of an eccentric shaft rotatably mounted in a frame which also has an opening therein for the film gate.

A compression spring is placed between the frame and the lens housing lever over the eccentric shaft, and a retainer is placed on the shaft on opposite sides of the lens housing lever to adjust the axial position of the lens housing lever on the shaft. This effects focusing of a lens system carried by the lens housing lever. The spring also has extensions on the ends which engage the lens housing lever and the frame to pivotally bias the lens housing lever against an adjustable stop which establishes the pivotal location of the lens housing lever about the shaft.

In a more specific embodiment of the invention, the lens system includes a pair of lens housing levers, each of which is used to focus the raster on a different channel of film in the film gate. Each lens system includes a lens housing lever which is pivotally mounted on an eccentric shaft which is rotatably mounted within the frame holding the film gate. A compression spring biases each of the lens housing levers against a focusing adjustment stop. The ends of the compression springs are used to bias the lens housing levers against corresponding adjustable stops to establish the pivotal location of the lens housing levers about the shafts.

A sub-assembly also is provided for mounting a pair of film gate prisms to direct the light from a dual lens assembly to the openings in the film gate. This sub-assembly includes a housing for a synchronizing lamp and the light guiding assembly therefor, and the sub-assembly is attached to the film gate which further has a pair of extending flanges to protect the prisms against possible damage. The collector prisms for receiving the light passing through the film in the film gate are banded together, along with a collector light pipe for a synchronizing channel, by a metal band which establishes a predetermined alignment between them; so that the entire sub-assembly of the collector prisms and the collector light pipe for the synchronizing channel may be properly positioned opposite the film gate to receive the modulated light passing therethrough.

BRIEF DESCRIPTION OF THE DRAWINGS

FIGS. 4, 5, 6 and 7 are different views of the lens adjustment portions of the lens assembly;

FIGS. 8, 9, 10, 11 and 12 show the synchronizing lamp housing and prism holder sub-assembly and its relation to the film gate.

DETAILED DESCRIPTION

Figure 1:
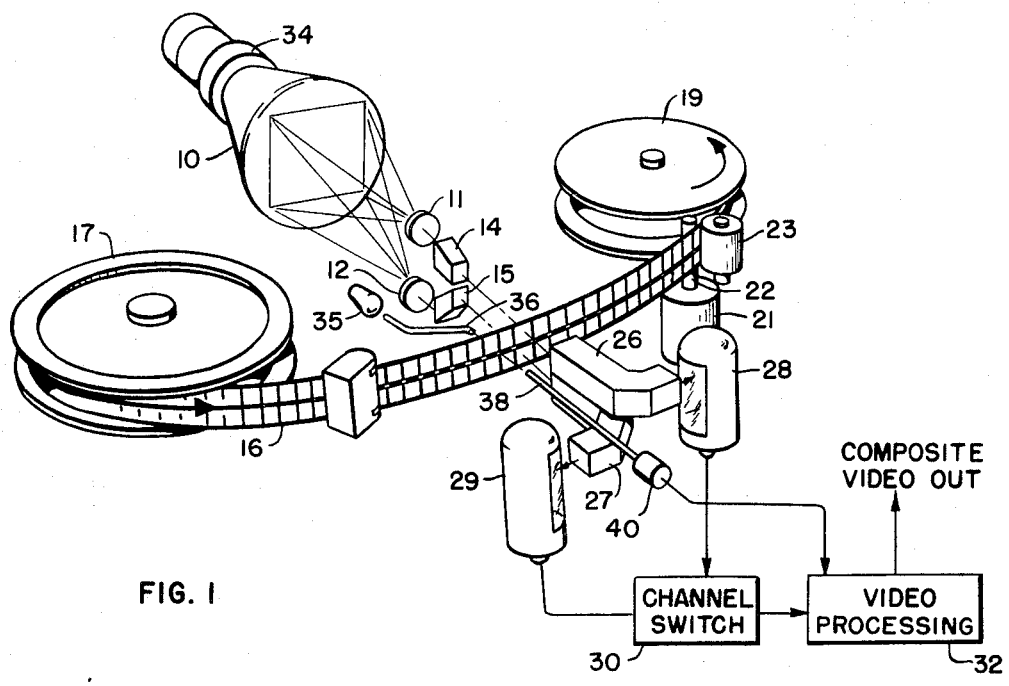
FIG. 1 is a schematic block diagram of the portion of an EVR player in which the lens assembly and collector prism assembly of a preferred embodiment of this invention may be used.

In the drawings the same reference numbers are used to designate the same or similar elements throughout the several figures.

Referring now to FIG. 1, there is shown in illustrative form portions of an electronic video player of the type with which the optical system of a preferred embodiment of this invention is used. In a typical EVR film player, a flying spot scanner cathode-ray-tube 10 is used to develop the scanning raster for scanning frames of film to which the player responds by generating RF signals supplied to a conventional television receiver. The television receiver then reproduces the images recorded on the film on the screen thereof. The flying spot scanner tube 10 is of a conventional type and operates to produce a raster on its phosphor screen at the vertical and horizontal line frequencies used in conventional television receivers. As shown in FIG. 1, the horizontal lines of the raster as reproduced on the television screen are produced vertically on the screen of the flying spot scanner tube 10, due to the direction of movement of the film shown in the drawing, with the vertical television raster proceeding from left to right across the screen of the flying spot scanner tube 10 shown in FIG. 1.

In a typical EVR player, the spot of light tracing the raster on the screen of the flying spot scanner tube 10 is focused by upper and lower lens systems 11 and 12, constituting a dual lens system, to a pair of corresponding prisms 14 and 15. The output surfaces of the prisms 14 and 15 are located adjacent a film gate (not shown in FIG. 1) past which a film 16 is moving. The light beams passing through the prisms 14 and 15 move in accordance with the raster on the screen of the flying spot scanner 10, but are traced at the film gate in rasters which are substantially reduced in size by the action of the lens systems 11 and 12. These reduced rasters correspond to the size of the frames of film 16 passing by the film gate. As indicated in illustrative manner in FIG. 1, the film 16 is removed from a film cartridge 17, intercepts the path of the light beams emanating from the prisms 14 and 15, and is wound up on a take-up reel 19. The drive for the film is effected by means of a synchronous motor 21 operating a capstan 22 against which the film is pressed by action of a pressure roller 23.

In a conventional EVR player, the film is continuously moved, unlike the operation of a motion picture projector in which the film stops momentarily at the film gate or shutter for reproduction. The light beam emanating from the prisms 14 and 15 is modulated in accordance with the images present on upper and lower tracks of the film. These tracks correspond to two different channels of information which can be two separate black and white video channels. Or one of the channels can be the luminance channel for a color television signal, with the other channel being encoded with the chrominance information; so that the composite of both channels acts to produce a complete color television signal.

The modulated light beams, after passing through the two channels on the film 16 in front of the prisms 14 and 15, are collected by upper and lower collector prisms 26 and 27, respectively, and are supplied to a pair of photomultiplier tubes 28 and 29. The outputs of these tubes are an electrical representation of the modulated light beams passing through the film 16.

The outputs of the photomultiplier tubes 28 and 29 are applied to a channel selection switch 30, which may be operated to select one or the other of the outputs of the photomultiplier tubes 28 and 29 for black and white information or which may be operated to a color position to simultaneously channel the information from both photomultiplier tubes 28 and 29 to a video processing circuit 32. This latter circuit provides the desired composite video output signal, which may be supplied to a conventional television receiver for reproduction therein.

To provide the necessary synchronizing signals for insertion into the composite signal applied to the video processing circuit 32, a synchronizing track is provided on the film 16 between the upper and lower information channels. This synchronizing track is opaque, with the exception of a small transparent window or hole between each frame on the information channels. A lamp 35 applies light continuously to a light pipe 36 which is aligned with the center of the film 16 on the same side as the prisms 14 and 15. Light from the end of the light pipe 36 passes through the windows in the synchronizing track and is collected by a corresponding light pipe 38 on the collector side of the film 16.

The light collected by the light pipe 38 is applied to a suitable photosensitive device in the form of a photo cell or light dependent resistor 40 which provides synchronizing signal output pulses at a frequency determined by the speed at which the film 16 moves past the end of the light pipe 36. These synchronizing signal output pulses then are supplied to the video processing circuit 32 and are used by the circuit 32 to provide the necessary synchronizing signal information in the composite video output signal. At the same time, these synchronizing signal pulses from the photosensitive device 40 also are utilized by circuitry (not shown) to control the generation of the horizontal and vertical deflection signals used to form the raster displayed on the face of the flying spot scanner tube 10. Such deflection signals are applied to a yoke 34 located on the neck of the flying spot scanner tube 10 and operate to deflect the beam therein in a conventional manner.

Figure 2:
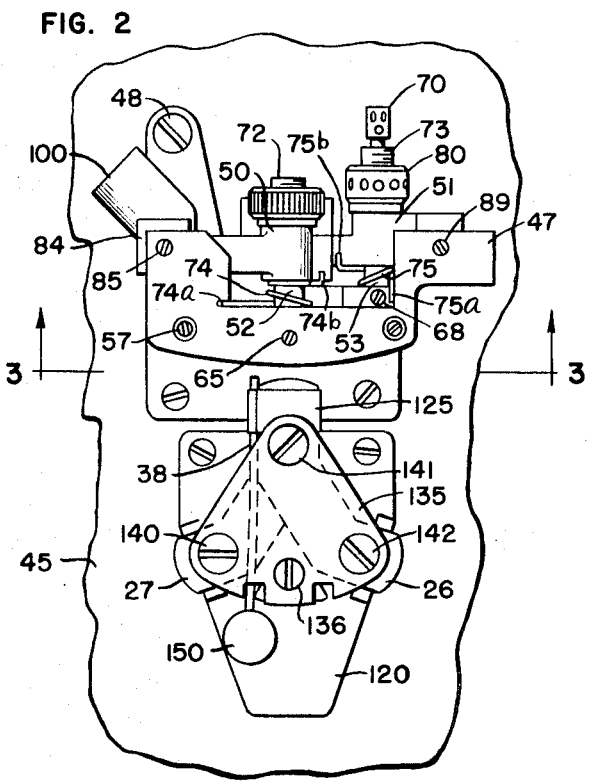
FIG. 2 is a top view of a lens assembly and collector prism assembly of a preferred embodiment of the invention.

Referring now to FIG. 2, there is shown a top view of the optical system or assembly portion of the player illustratively indicated in FIG. 1. The optical assembly shown in FIG. 2 is mounted on a chassis 45 along with other components of the player. The chassis 45 is shown broken away in FIG. 2 to illustrate only the portion upon which the optical assembly of the player is mounted. The lens system is mounted on a frame 47, which has a lower surface placed on the upper surface of the chassis 45, with the frame 47 being fastened to the chassis by any suitable fastened means such as a threaded fastener 48 as shown in FIG. 2.

Upper and lower lens systems are mounted in openings in lens housing levers 50 and 51, respectively, with the lens housing levers 50 and 51 in turn being pivotally mounted on a pair of eccentric shafts 52 and 53, which are rotatably mounted in the frame 47. These shafts most clearly may be seen in FIGS. 6 and 7, with the relative locations of the shafts 52 and 53 with respect to the front or film gate side of the frame 47 most clearly being seen in FIG. 3.

Figure 3:
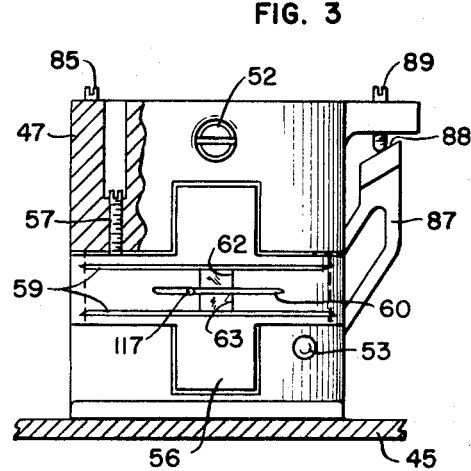
FIG. 3 illustrates a film gate of an EVR player with which the lens assembly of a preferred embodiment of the invention may be used.
Figure 14:
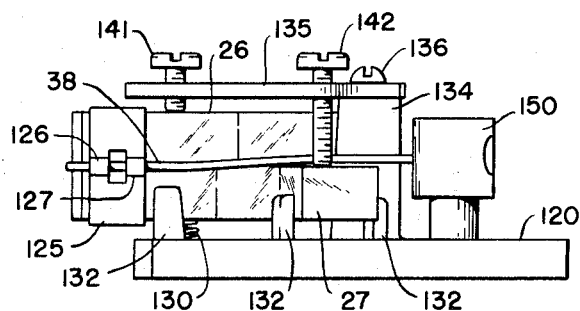
FIGS. 13, 14, 15, 16 and 17 show details of the collector prism assembly used in a preferred embodiment of the invention.

As shown in FIG. 3, the front of the frame 47 has a recess cut therein in which a film gate 56 is mounted by means of a pair of set screws, one of which, 57, is shown in the partially cut-away view of FIG. 3. The horizontal ends of the film gate 56 (as viewed in FIG. 3) abut against a recessed portion in the sides of the frame 47 to establish the location of the front face of the film gate 56 with respect to the front of the frame 47. This is most clearly shown in FIG. 5, which also shows that the film gate 56 includes a pair of upper and lower grooves or notches 59 and a raised center rib 60; so that film passing over the film gate is frictionally engaged or supported only at the edges and in the center. This prevents scratching of the portions of the film bearing the video information which is to be reproduced by the player, so that repeated playing of a film in the player subjects the film to minimum degradation. The upper edge of the upper notch 59 serves as the guiding edge for the film to align the film properly as it is drawn past the film gate openings or apertures 62 and 63, directly behind which are located the output surfaces of the prisms 14 and 15, respectively.

In order to cause the raster which is directed by the prisms 14 and 15 to accurately superimpose on the frames of film being drawn past the film gate apertures 62 and 63, it is necessary to provide for focusing and positional adjustment of the lens systems 11 and 12. This is especially important when the film 16 includes color information, since the scanning of the frames of the color channel must accurately coincide with the scanning of the corresponding frames of the luminance channel; so that the brightness and color information of the image reproduced in the television receiver, which is responsive to the output signals from the player, is properly superimposed.

The lens systems 11 and 12 are located substantially directly above one another with the centers on a vertical line extending substantially perpendicularly from the base of the frame 47 which is attached to the chassis 45. The locations of the eccentric shafts 52 and 53 are such as to cause the lens systems 11 and 12 carried in holders or housings on the ends of the upper and lower lens housing levers 50 and 51 initially to closely assume the desired position. Slight vertical adjustments of the lens system 11 carried by the lens housing lever 50 are effected by rotation of the eccentric shaft 52 (best shown in FIG. 6) by means of the slotted end which is accessible from the front of the frame 47, as shown in FIG. 3. To prevent undesired rotation of the shaft 52 once an initial adjustment has been made, a set screw 65 is threaded into the top of the frame 47 (best shown in FIG. 2) and engages a restricted portion 67 of the shaft located within the frame 47 to securely lock the shaft 52 against rotation when the set screw 65 is tightened. Loosening of the set screw 65, however, permits free rotation of the shaft 52 within the frame 47 to eccentrically adjust the position of the upper lens housing lever 50.

A similar adjustment of the horizontal position of the lens system 12 is also effected by rotation of the eccentric shaft 53. This shaft also has a portion extending through the frame 47 for rotation within the frame and is held against rotation by a set screw 68 which engages a reduced diameter portion 69 of the shaft located within the frame 47. When the set screw 68 is released, an extension 70 on the right-hand end of the shaft 53, as viewed in FIG. 7, may be rotated to effect the eccentric positioning of the extended portion of the shaft 53 about which the lens housing lever 51 pivots. The extension 70 is provided for effecting this rotary eccentric adjustment of the shaft 53 instead of using a slotted end accessible from the front of the frame 47, since with the player fully assembled with the light collecting prisms 26 and 27 in position, it is difficult to effect an adjustment of the shaft 53 from the front of the frame 47.

Focusing of the lens systems 11 and 12, carried by the lens housing levers 50 and 51, is accomplished by moving the lens systems 11 and 12 closer to the screen of the flying spot scanner tube 10 or closer to the rear surfaces of the prisms 14 and 15 until the spot of light produced on the screen of the flying spot scanner tube 10 is properly focused on the film 16. A lateral or axial adjustment of the lens housing levers 50 and 51, and therefore of the lens systems 11 and 12, is effected by providing threaded portions 72 and 73 on the rear portions of the eccentric shafts 50 and 51, as viewed in FIG. 2, or on the right-hand end portions of these shafts, as viewed in FIGS. 6 and 7.

In assembling the lens systems, a pair of compression springs 74 and 75 are placed over the shafts 52 and 53, respectively. The lens housing levers 50 and 51 are placed over the shafts followed by washers 77 and 78. A thumb screw 79 threadedly engages the portion 72 of the shaft 52, and a thumb screw 80 threadedly engages the threaded portion 73 of the shaft 53. The springs 74 and 75 are placed in sufficient compression to urge the respective lens housing levers 50 and 51 against the washer and thumb screw combinations 77, 79 and 78, 80, respectively. Rotation of the threaded thumb screws 79 and 80 then is used to position the lens housing levers 50 and 51 along the axes of the shafts 52 and 53 to focus the lens systems 11 and 12.

Each of the springs 74 and 75 has a pair of end extensions, 74a and 74b for the spring 74 and 75a and 75b for the spring 75. These extensions are placed under torsion between the frame 47 and the corresponding lens housing levers 50 and 51. The spring 74 urges the lens housing lever 50 to rotate counter-clockwise about the shaft 52, as viewed in FIG. 4, and the spring 75 causes the lens housing lever 51 to be urged to rotate clockwise about the shaft 53, as viewed in FIG. 4. The manner in which the springs 74 and 75 are placed in torsion is best illustrated in FIGS. 2, 6 and 7. Thus, the springs 74 and 75 serve a dual function, operating as compression springs to cooperate with the thumb screws 79 and 80 to focus the lens systems carried by the lens housing levers 50 and 51 and in addition operating as torsion springs to rotate the lens housing levers 50 and 51 about their respective shafts 52 and 53.

Control of the rotational or pivotal position of the lens housing levers 50 and 51 is provided by making each of the lens housing levers 50 and 51 in a generally L-shaped configuration. The lens housing lever 50 is pivoted about the shaft 52 substantially at the bend in the L with the lens holding portion for the lens system 11 depending downwardly from the shaft 52. An adjusting lever extension 84 extends to the right, as viewed in FIG. 4, and to the left, as viewed in FIG. 2. The upper surface of the extension 84 engages the bottom of an adjustable set screw 85 which is threaded through an extension or flange on the housing member 47 overlying the upper surface of the extension 84. Thus, vertical adjustment of the threaded set screw 85 in the frame 47 operates to adjust the stop against which the lever extension 84 is biased by the spring 74. Movement of the threaded fastener downwardly, as shown in FIG. 4, causes the lens housing lever 50 to pivot clockwise about the shaft 52 thereby moving the lens systems 11 toward the left, as viewed in FIG. 4. On the other hand, movement of the threaded set screw 85 upwardly, as viewed in FIG. 4, permits the spring extensions 74a and 74b to bias the lens housing lever 50 in a counter-clockwise rotational direction to move the lens system 11 to the right, as viewed in FIG. 4.

A similar adjustment of the lens system 12 in a substantially vertical direction, as viewed in FIG. 4, is effected by means of an extension 87 which extends upwardly and to the left of the shaft 53 as seen in FIG. 4. The extension 87 has a slanted camming surface 88 on the upper edge thereof which is engaged by a set screw 89 threaded through an extension or flange 90 on the frame 47. The extension 90 extends over the camming surface of the lever 87, so that the end of the set screw 89 engages the camming surface 88 of the extension 87. Downward movement of the set screw 89 causes the lens housing lever 51 to pivot counter-clockwise about the shaft 53 against the urging of the spring extensions 75a and 75b, so that the lens system 12 is essentially adjusted upwardly. On the other hand, movement of the threaded set screw 89 upwardly, as viewed in FIG. 4, permits the lens housing lever 51 to pivot clockwise about the shaft 53, causing the lens system 12 to be adjusted substantially downwardly as viewed in FIG. 4.

The combination of adjustments which are effected by the eccentric shafts 52 and 53 and the set screws 85 and 89 cooperating with the extensions 84 and 87 permit both vertical and horizontal independent positioning of both lens systems 11 and 12 with respect to the prisms 14 and 15 and with respect to the screen of the flying spot scanner tube 10. Finally, the focusing adjustment which is effected by means of the compression springs 74 and 75 and the thumb screws 79 and 80 completes the necessary adjustments which may need to be made to cause the raster produced by the flying spot scanner tube 10 to be properly focused and aligned with the information carried in the frames on the film 16 moving past the lens gate openings 62 and 63.

Figure 12:
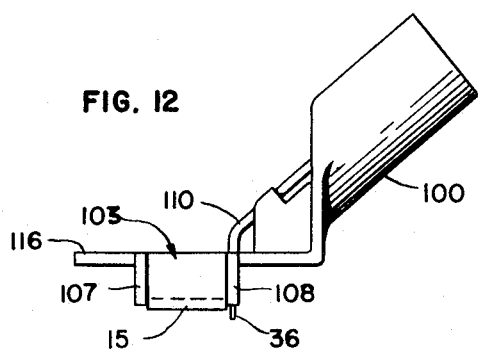

The lens and lens gate housing assembly is completed by a sub-assembly frame which includes a housing 100 for enclosing the synchronizing lamp 35 (best shown in FIG. 12). Integrally cast with the housing 100 is a prism holder 101 including a pair of prism mounting surfaces 102 and 103 (FIG. 9) to which the prisms 14 and 15 are attached by means of a suitable binder such as epoxy glue or the like. The edges of each of the surfaces 102 and 103 are terminated in a pair of guide flanges 104, 105 for the mounting surface 102 and 107, 108 for the mounting surface 103 (FIGS. 8, 9 and 10) to hold the prism 14 and 15 in proper alignment during mounting. The flanges 104, 105, 107 and 108 also serve to protect the inside corners of the prisms 14 and 15 from damage.

A small hole is formed in the lamp and prism holder casting where the surfaces 102 and 103 meet and substantially between the flanges 105 and 108. The light pipe 36 illustrated in FIG. 1 terminates in the hole and extends into a similar hole formed in the lamp housing member 100. The light pipe 36 is in the form of a very small diameter fiber optic rod or filament and is protected against damage by sheathing it in a metal tube 110 extending from the housing 100 and terminating at the hole formed through the casting between the flanges 105 and 108. The details of this protective sheath and the light pipe 36 may best be seen in FIGS. 10 and 11. The relative angle at which the lamp housing 100 is placed with respect to the prism mounting surfaces 102 and 103 may best be seen in FIG. 12 which constitutes a top view of the assembly oriented in the manner in which it is assembled into the completed assembly as shown from the top view in FIG. 2.

The sub-assembly including the casting with the lamp housing 100 and the crystal surfaces 102, 103 is attached to the film gate 56 by means of threaded fasteners 111, 113 located near the lamp housing 100 and a threaded fastener 115 extending through an extension 116 located on the opposite side of the prism-holding portion of the sub-assembly. The threaded fasteners 111, 113 and 115 engage corresponding mounting surfaces on the rear of the film gate 56. The end of the light pipe 36 is terminated in a synchronizing track aperture 117 formed in the rib 60. The location of the aperture 117 is such that when the upper edge of a frame recorded on the film 16 coincides with the left-most edge of the aperture 62 or 63 of the film gate 56 shown in FIG. 3, a synchronizing window or hole in the film is aligned with the aperture 117 to permit light to pass from the light pipe 36 through the aperture 117 to the end of the light pipe 38 which is aligned with the aperture 117 on the collector prism assembly as shown in FIG. 2.

To protect the upper exposed edges of the prisms 14 and 15 against accidental blows which could dislodge the prisms or chip therein, a pair of protective flanges 118 and 119 extend from the rear of the film gate 56 over the prisms 14 and 15, respectively.

Figure 15:
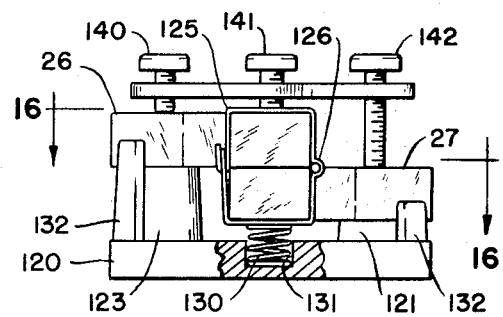

The collector prism assembly is shown in FIGS. 13 to 17 and includes a base plate 120 which may be attached to the chassis 45, shown in FIG. 2, in any suitable manner. The base plate 120 includes a lower prism support member 121 for the collector prism 27 and an upper prism support member 123 for supporting the underside of the collector prism 26. The collector prisms 26 and 27, along with the collector light pipe 38 for detecting the synchronizing light, are clamped and held together in a light collector sub-assembly by a metal band 125 which may be made of copper or some similar material. The band 125 has a formed portion for accommodating the outer dimensions of the light pipe 38 and the collector prisms 26 and 27 as best seen in FIG. 15.

Figure 13:
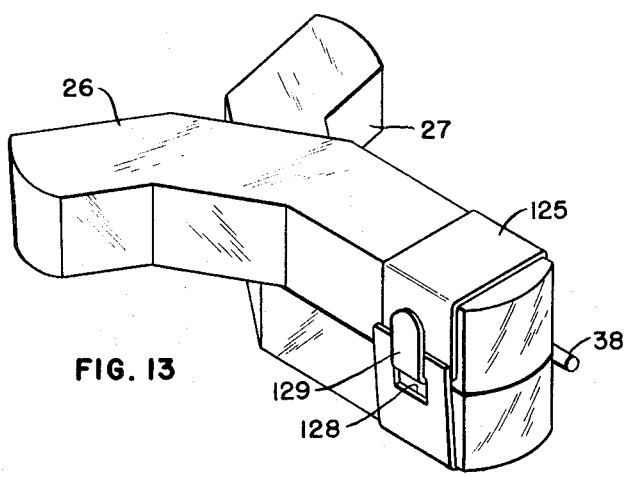
Figure 16:
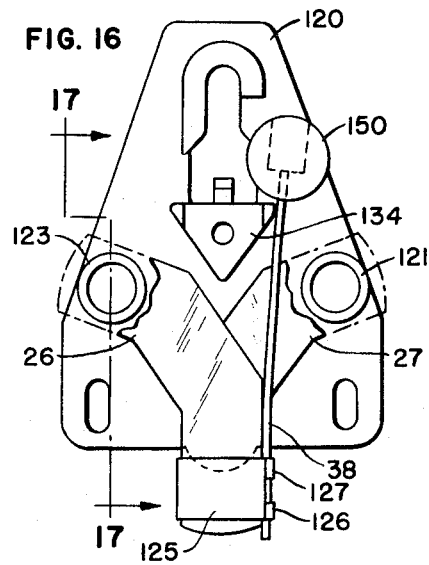

To relieve stress on the light pipe 38, which is of relatively small diameter, the portion of the band 125 extending over the light pipe 38 is cut out, as shown in FIG. 16, leaving two relatively narrow bands of material 126 and 127 extending over the light pipe 38 to clamp it against the collector prisms 26 and 27. The band 125 is wrapped around the assembly, and one end includes an opening or aperture 128 is engaged by a tab 129 which is passed through the opening 128 and bent upwardly, as shown in FIGS. 13 and 15, to tightly clamp the collector prisms 26 and 27 and the light pipe 38 together. If desired, a piece of non-reflective material may be placed between the collector prisms 26 and 27 where they overlie one another to prevent spurious light reflections from one of the prisms into the other. It has been found, however, that such a light barrier is not usually necessary.

Figure 17:
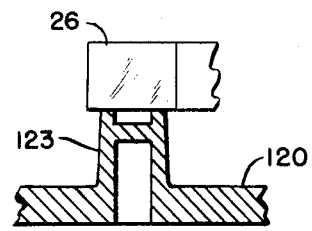

The sub-assembly shown in FIG. 13 is placed on the base plate 120, with the lower rear surface of the prism 27 resting on the upper surface of the support member 121 and the lower rear surface of the prism 26 resting on the upper surface of the support member 123. The support members 121 and 123 are similar, and FIG. 17 is a cross sectional view of the support member 123, illustrating the manner in which the prism 26 rests thereupon.

To prevent the light collector prism assembly 26, 27, 38 from being displaced laterally, the plate 120 has a number of upstanding guide flanges 132 to hold the sub-assembly shown in FIG. 13 in proper position on the base plate 120. To hold the light collector sub-assembly in place on the base plate 120, the base plate is provided with an upstanding triangular post 134 to which a top cover plate 135 is attached by means of a threaded fastener 136. The cover plate 135 also has threaded openings therein for engaging three set screws 140, 141, and 142, with the set screw 140 pressing the top of the prism 26 against the upper surface of the support post 123. Similarly, the set screw 142 presses the light collector prism 27 against the upper surface of the support post 121.

The portion of the band 125 which underlies the lower surface of the prism 27 rests on a compression spring 130, which is placed in a recess 131 (best shown in FIG. 15).

The set screw 141 bears against the portion of the band 125 overlying the upper surface of the light collector prism 26 to bias the forward end of the sub-assembly shown in FIG. 13 downwardly against the compression spring 130. This permits vertical adjustment of the light collector assembly to a proper position opposite the apertures 62, 63 and 117 in the film gate 56; so that the light emanating from the prisms 14 and 15 and passing through the frames of the film is properly directed to the ends of the light collecting prisms 26 and 27, respectively at the same time, the light pipe 38 is aligned with the aperture 117 to be responsive to the synchronizing windows in the film 16 passing over the film gate 56.

Also attached to the base plate 120 of the light collector assembly is a housing 150 into which the photoresponsive device 40 for providing the synchronizing pulses is placed. The light pipe 38 terminates in an aperture in this housing (indicated in dotted lines in FIG. 16) to thereby direct the light guided by the light pipe 38 to the photosensitive device 40 which is placed within the housing 150.

I claim:

1. In an EVR player including a flying spot scanner cathode-ray-tube generating a moving spot of light on the screen thereof in a predetermined raster for scanning a film to be reproduced by the player, a film gate having an opening past which the film moves, and a lens system for focusing the raster from the screen of the flying spot scanner onto the film at the film gate, a lens adjustment and alignment apparatus including in combination:

a frame member having an opening therein for accommodating said film gate and for permitting a beam of light to pass through said opening in a predetermined direction;

a shaft rotatably mounted in said frame member and having an axis extending substantially parallel to said predetermined direction, said shaft having an extended portion extending beyond said frame member with the extended portion having an axis eccentrically offset but parallel to the axis of the portion of the shaft rotatably mounted in said frame member;

a lens housing lever carrying a lens holder at one end thereof into which said lens system may be mounted and rotatably mounted at the other end thereof on the extended portion of said shaft;

means for moving said lens housing lever on the extended portion of said shaft axially thereof to effect focusing of said lens system; and means for rotating said lens housing lever about the extended portion of said shaft so that rotation of said shaft within the frame member and rotation of the lens housing lever about the extended portion of said shaft may be utilized to effect placement of the lens system to a predetermined position with respect to the film gate.

2. The combination according to claim 1 further including a compression spring having first and second extended ends and mounted on the extended portion of said shaft between said frame member and said lens housing lever in compression to bias said lens housing lever away from said frame member;

retaining means mounted on the extended portion of said shaft on the side of said lens housing lever opposite the side engaged by said compression spring for effecting location of the lens housing lever axially on the extended portion of said shaft in accordance with the position of said retaining means;

a first surface on said frame member and a second surface on said lens housing lever with said surfaces positioned for engagement by the first and second ends, respectively, of said spring to cause said spring also to operate as a torsion spring, rotatably biasing said lens housing lever in a predetermined direction about the extended portion of said shaft; and adjustable stop means against which said spring biases said lens housing lever with the position of said adjustable stop means determining the rotative position which said lens housing lever attains.

3. The combination according to claim 2 wherein said lens housing lever is of generally L-shaped configuration rotatably mounted on the extended portion of said shaft substantially at the bend of the L, carrying at one end thereof said lens holder and having at the other end thereof a surface for engaging said adjustable stop means, and said adjustable stop means is linearly movable in a direction to pivot said lens housing lever about the axis of the extended portion of said shaft with said spring biasing the stop engaging surface of said lens housing lever against said linearly adjustable stop means.

4. The combination according to claim 3 wherein said linearly adjustable stop means includes a set screw threaded through a portion of said frame member and extending therebeyond to engage the stop engaging surface of said lens housing lever.

5. The combination according to claim 1 wherein said player further includes a prism located between said lens system and the opening in said film gate, said film gate has a synchronizing light aperture located therein, and said player includes a synchronizing lamp and means for directing light from said lamp to the aperture in said film gate.

6. The combination according to claim 5 further including a second frame member having a mounting surface for said prism and a synchronizing light housing integrally formed with said mounting surface and having support means for a light guiding channel between the synchronizing light housing and the aperture in said film gate.

7. The combination according to claim 6 further including a light collector assembly for collecting light passing through the opening and the aperture, the light collector assembly including at least one light collecting prism, a synchronizing light pipe, and clamp means wrapped about said collecting prism and said synchronizing light pipe, said clamp means formed to provide a predetermined alignment of the ends of said collecting prism and said synchronizing light pipe.

8. The combination according to claim 6 including means for fastening said second frame member to the side of said film gate opposite the side past which the film moves, with said opposite side of said film gate further including a flange extending over said prism with said second frame member mounted on said film gate to protect said prism against possible damage.

9. In an EVR player including a flying spot scanner generating a moving spot of light in a predetermined raster for scanning film to be played in the player, a film gate over which film to be played passes, with the film having first and second channels thereon and the film gate having first and second openings corresponding to the first and second channels to permit simultaneous scanning of the film in each of the openings in the film gate, and a dual lens system for directing the light generated by the flying spot scanner simultaneously to the first and second openings in the film gate, a lens adjustment and alignment apparatus including in combination:

a frame having an opening therein for mounting said film gate;

a first eccentric support shaft rotatably mounted in said frame and having an extended portion extending beyond said frame;

a second eccentric support shaft, spaced from said first support shaft, rotatably mounted in said frame, and having an extended portion extending beyond said frame, the axes of the first and second support shafts being substantially perpendicular to the plane of a film located in said film gate;

a first lens housing lever pivotally mounted on the extended portion of said first shaft and carrying at one end thereof a first lens housing for housing a first lens system;

a second lens housing lever pivotally mounted on the extended portion of said second shaft and carrying on one end thereof a second lens housing for housing a second lens system, the lengths of said first and second lens housing levers and the locations of said first and second eccentric shafts causing said first and second lens systems to be positioned substantially opposite the two openings in said film gate;

first and second focusing means for axially moving said first and second lens housing levers toward and away from said film gate for effecting focusing of said lens systems;

means for rotating said first and second eccentric shafts within said frame to thereby effect relative offset adjustments of said first and second lens systems in accordance with the rotative positions of said first and second eccentric shafts;

locking means for locking said first and second eccentric shafts to prevent rotation thereof; and first and second adjusting means for adjusting the pivotal locations of said first and second lens housing levers on said first and second eccentric shafts, respectively.

10. The combination according to claim 9 wherein said first and second focusing means include first and second compression springs each having first and second extended ends, with said first compression spring mounted in compression on the extended portion of said first shaft between said frame and said first lens housing lever to bias said first lens housing lever away from said frame, and said second compression spring mounted in compression on the extended portion of said second shaft between said frame and second lens housing lever to bias said second lens housing lever away from said frame;

first and second retaining means mounted on the extended portions of said first and second shafts, respectively, on the side of said first and second lens housing levers opposite the side engaged by said first and second compression springs for effecting location of the first and second lens housing levers axially on said first and second shafts in accordance with the positions of said first and second retaining means, respectively;

a first surface on said frame and a second surface on said first lens housing lever with said surfaces positioned for engagement by the first and second ends, respectively, of said first spring to cause said first spring to operate as a torsion spring, pivotally biasing said first lens housing lever in a predetermined direction about the extended portion of said first shaft;

a third surface on said frame and a fourth surface on said second lens housing lever with said third and fourth surfaces positioned for engagement by the first and second ends, respectively, of said second spring to cause said second spring to operate as a torsion spring pivotally biasing said second lens housing lever in a predetermined direction about the extended portion of said second shaft;

first adjustable stop means against which said first spring biases said first lens housing lever, with the position of said first adjustable stop means determining the pivotal position which said first lens housing lever attains; and second adjustable stop means against which said second spring biases said second lens housing lever, with the position of said second adjustable stop means determining the pivotal position which said second lens housing lever attains.

11. The combination according to claim 10 wherein said first and second lens housing levers both are of generally L-shaped configuration, pivotally mounted on the extended portions of said first and second shafts, respectively, substantially at the bends of the L, carrying at one end thereof said first and second lens holder respectively, and each having at the other end thereof a stop engaging surface for engaging said adjustable stop means, and said first and second adjustable stop means are linearly movable in a direction to pivot said first and second lens housing levers about the axis of the corresponding extended portions of said first and second shafts, with said first and second springs biasing the stop engaging surfaces of said first and second housing levers against said linearly movable first and second stop means, respectively.

12. The combination according to claim 10 wherein said first and second linearly adjustable stop means include first and second set screws threaded through the same surface of said frame member on opposite sides of said film gate openings with said set screws extending beyond said frame member to engage the stop engaging surfaces of said first and second lens housing levers, respectively, and the first and second shafts are located in said frame so that a line passing through the centers of the first and second lens housings passes through no more than one of the axis of said first and second shafts to cause the pivotal adjustment of said lens systems effected by said first and second adjustable stop means to be along substantially intersecting lines.

13. The combination according to claim 12 wherein said first lens housing lever is mounted on said first shaft with said end carrying the stop engaging surface therefor extending substantially at right angles to said first set screw, and said second lens housing lever is mounted on said second shaft with said end carrying the stop engaging surface therefor extending substantially in alignment with said second set screw, the stop engaging surface of said second lever comprising a camming surface at the end of said second lever.

* * * * *

UNITED STATES PATENT OFFICE
CERTIFICATE OF CORRECTION

Patent No. 3,722,990      Dated March 27, 1973

Inventor(s) Daniel J. Vondran

It is certified that error appears in the above-identified patent and that said Letters Patent are hereby corrected as shown below:

Column 14, line 1, claim reference numeral "10" should read -- 11 -- ; lines 10 and 11, "no more than" should read -- only -- .

Signed and sealed this 28th day of August 1973.

(SEAL)
Attest:

EDWARD M. FLETCHER, JR.          RENE D. TEGTMEYER
Attesting Officer                 Acting Commissioner of Patents